(12) United States Patent
Philippin et al.

(10) Patent No.: US 11,331,736 B2
(45) Date of Patent: May 17, 2022

(54) MOVING SYSTEM AND GEAR-CUTTING MACHINE

(71) Applicant: GLEASON-PFAUTER MASCHINENFABRIK GMBH, Ludwigsburg (DE)

(72) Inventors: Matthias Philippin, Rutesheim (DE); Uwe Rusch, Ludwigsburg (DE); Daniel Staiger, Pfullingen (DE); Peter Müller, Bietigheim-Bissingen (DE); Sabrina Gressler, Ingersheim (DE); Andreas Gross, Marbach (DE); Dietmar Kohler, Illingen (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 271 days.

(21) Appl. No.: 16/612,034

(22) PCT Filed: Jun. 8, 2018

(86) PCT No.: PCT/EP2018/065121
§ 371 (c)(1),
(2) Date: Nov. 8, 2019

(87) PCT Pub. No.: WO2018/234062
PCT Pub. Date: Dec. 27, 2018

(65) Prior Publication Data
US 2021/0154759 A1     May 27, 2021

(30) Foreign Application Priority Data

Jun. 19, 2017   (DE) .......................... 102017005756.7

(51) Int. Cl.
*B23F 23/04*      (2006.01)
*B23Q 7/04*       (2006.01)
(Continued)

(52) U.S. Cl.
CPC .............. *B23F 23/04* (2013.01); *B23F 23/02* (2013.01); *B23Q 7/005* (2013.01); *B23Q 7/04* (2013.01); *Y10T 409/100954* (2015.01)

(58) Field of Classification Search
CPC . Y10T 409/100954; Y10T 409/100795; B23F 23/04; B23F 23/02;
(Continued)

(56) References Cited

U.S. PATENT DOCUMENTS

| 3,659,496 A | 5/1972 | Bergemann et al. |
| 4,642,212 A * | 2/1987 | Bailey ...................... B25J 19/00 29/527.3 |

(Continued)

FOREIGN PATENT DOCUMENTS

| DE | 3618536 A1 | 1/1987 |
| DE | 102007019558 A1 | 10/2008 |

(Continued)

OTHER PUBLICATIONS

Machine Translation of JP 2014-030874-A, which JP '874 was published Feb. 2014.*

(Continued)

*Primary Examiner* — Erica E Cadugan
(74) *Attorney, Agent, or Firm* — Robert L. McDowell

(57) ABSTRACT

The invention relates to a moving system (100) for moving workpieces that are provided for gear cutting on a workpiece spindle (200) and have a workpiece axis of rotation, from a first position (A), taken up while they are being fed, into a third position (C) that differs from the first position by at least a smaller distance between the workpiece axis of rotation and the workpiece spindle axis, having a first movement unit (36, 32, 34) which moves a workpiece from the first position into a second position (B), different from the first and the third position, along a first movement path
(Continued)

(AB), and a second movement unit (35) which moves the workpiece from the second position into the third position along a second movement path (BC), wherein the moving system is also designed to move machined workpieces back out of the third position and to hold and move more than one workpiece at the same time, wherein, while it is being moved on the first and on the second movement path, the workpiece is held by one and the same holding unit (10, 10') that directly holds the workpiece, without a movement caused by the second movement unit entailing a movement of the first movement unit.

20 Claims, 5 Drawing Sheets

(51) Int. Cl.
  *B23F 23/02*    (2006.01)
  *B23Q 7/00*    (2006.01)
(58) Field of Classification Search
  CPC . B23Q 7/04–7/048; B25J 9/041–9/044; Y10S 901/17
  USPC .......................... 409/7, 6; 901/17; 414/744.3
  See application file for complete search history.

(56) References Cited

U.S. PATENT DOCUMENTS

| | | | |
|---|---|---|---|
| 4,744,707 A | 5/1988 | Negri et al. | |
| 5,205,806 A * | 4/1993 | Ishida | B23F 23/04 409/11 |
| 5,885,038 A * | 3/1999 | Huber | B23F 23/04 198/346.2 |
| 5,904,457 A * | 5/1999 | Suwijn | B23F 23/04 409/134 |
| 6,185,818 B1 * | 2/2001 | Ito | B23Q 1/76 29/889.7 |
| 2005/0235788 A1 | 10/2005 | Krell et al. | |
| 2013/0223945 A1 | 8/2013 | Kato et al. | |
| 2013/0225379 A1 * | 8/2013 | Kato | B23F 19/10 483/1 |
| 2021/0299888 A1 * | 9/2021 | Shibata | B23Q 7/043 |

FOREIGN PATENT DOCUMENTS

| | | |
|---|---|---|
| DE | 102012023978 A1 | 6/2014 |
| DE | 112013000290 T5 | 8/2014 |
| JP | 2005-238358 A * | 9/2005 |
| JP | 2013-208686 A * | 10/2013 |
| JP | 2014-030874 A * | 2/2014 |
| JP | 2020-073301 A * | 5/2020 |
| WO | 2014/086466 A1 | 6/2014 |

OTHER PUBLICATIONS

Machine Translation of JP 2005-238358 A, which JP '358 was published Sep. 2005.*
International Search Report and Written Opinion for PCT/EP2018/0065121, ISA/EPO, dated Sep. 21, 2018, 14 pgs.
German Patent Office Search Report for DE 102017005756.7, dated Feb. 8, 2018, 7 pgs.

* cited by examiner

MOVING SYSTEM AND GEAR-CUTTING MACHINE

BRIEF SUMMARY

The invention relates to a moving system for moving workpieces that are provided for gear cutting on a workpiece spindle and have a workpiece axis of rotation, from a first position, taken up while they are being fed, into a third position that differs from the first position by at least a smaller distance between the workpiece axis of rotation and the workpiece spindle axis, having a first movement unit which moves a workpiece from the first position into a second position, different from the first and the second position, along a first movement path, and a second movement unit which moves the workpiece from the second position into the third position along a second movement path, wherein the moving system is also designed to move machined workpieces back out of the third position and to hold and move more than one workpiece at the same time, and also to a gear-cutting machine provided with a moving system of this type.

Moving systems of this type are known as components of loading and unloading systems of gear-cutting machines, for contributing to moving workpieces that are to be machined onto the workpiece spindle of the gear-cutting machine and moving machined workpieces back away from the workpiece spindle. The workpieces are fed in the form of uncut blanks if the gear-cutting machine is, for example, a hob-cutting, gear-shaping or hob-peeling machine, but in the form of already pre-cut workpieces in the case of gear cutting post-processing, such as gear grinding.

Often, moving systems of this type comprise ring loaders, which move a workpiece from a position in which the workpiece axis of rotation does not correspond to the workpiece spindle axis, through a pivot movement, into a position in which the workpiece axis of rotation does correspond to the workpiece spindle axis. A ring loader of this type usually simultaneously moves an already machined workpiece from the latter position into the former position, the movement vectors of the two movements forming a circle when combined.

Feeding and removal systems, for example in the form of feed belts on which a plurality of workpieces each arranged on a workpiece pallet are in circulation, often cooperate with ring loaders of this type. In the case of a vertical workpiece spindle axis, for example, the feed belt is usually below the vertical level at which the ring loader rotates, and so a lifting station is used on the feed side and removal side of the ring loader and lifts the workpiece pallet sufficiently for the workpiece to reach the vertical level of the ring loader.

Moreover, loading robots are known comprising a gripper arm which has sufficiently many degrees of freedom of movement to move a supplied workpiece onto a workpiece spindle. However, before a new workpiece can be loaded, the robots initially have to unload again a workpiece that has just been machined. Loading robots of this type do have a high individual usability, but increase the auxiliary process times by the amount of time required for the unloading movement.

The object of the invention is to design a moving system of the type mentioned at the outset more simply, while maintaining satisfactorily short movement times.

This object is achieved by the invention by a development of a moving system of the type mentioned at the outset, which is basically characterized in that, while it is being moved on the first and on the second movement path, the workpiece is held by one and the same holding unit that directly holds the workpiece, without a movement caused by the second movement unit entailing a movement of the first movement unit.

The inventive solution makes rapid and simple movement of the workpieces possible in that the holding unit provides integration of the workpiece movements on the first and second movement path, but, as a result of the decoupling on the movement side, a simple construction with satisfactorily low inertia for the movement of the second movement path is achieved while avoiding additional stations.

In a preferred embodiment, the first movement unit and/or the second movement unit have only one degree of freedom of movement. This increases the simplicity of the system.

In a particularly preferred embodiment, the second movement unit is a rotary movement unit. This makes possible simple implementations of workpiece movements from the third position into the second position, in addition to the movement along the second movement path.

In an expedient embodiment, the first movement unit is a linear movement unit, in particular for a vertical movement. In this way, level differences can be compensated in a particularly simple manner, and in particular additional, separate lifting stations are not required.

In a particularly preferred embodiment, the second movement path is curved and preferably takes the form of an arc portion, in particular a semicircle. This makes possible repeated movement of a plurality of workpieces along a closed path that includes the second movement path.

In a more preferred embodiment, the workpiece machining takes place not in the third position but in a fourth position different from the third position. For this purpose, a third movement unit may be provided, which causes the workpiece that is still held directly by the holding unit to be moved from the third position along a third movement path into the fourth position. Expediently, a movement caused by the second movement unit also does not lead to a movement of the third movement unit. In a preferred, simple case, the axis of the third movement path extends parallel to the axis of the first movement path, which preferably extends orthogonal to a plane in which the second movement path lies. In a particularly preferred case, where a vertical workpiece spindle axis is provided along with an upright workpiece spindle, the movement along the third movement path corresponds to depositing the workpiece on the clamping device coupled to the workpiece spindle to receive the workpiece.

In a preferred constructional design of the moving system, it has a guide arrangement, which guides the holding unit during the movement on the first movement path and moves together with the movement along the second movement path. This ensures that the spatial regions permitted by the system for each of the movements are reliably adhered to. Preferably, the guide arrangement is simultaneously a guide arrangement during the movement along the third movement path.

In an expedient embodiment, the moving system has a running rail, on which the holding unit rolls or slides during the movement along the second movement path. In addition, the running rail and the coupling of the holding unit to the holding rail preferably have a holding function counter to the effect of gravity.

In a particularly preferred embodiment, the rotary movement unit is clocked in a 360.degree./n step, where n is preferably 2, 3 or 4, in particular 2. In this connection, the moving system preferably has n.gtoreq.2 holding units, in particular formed identically. In particular, all n holding units may temporarily simultaneously be arranged in such a way that the workpieces held thereby can move along a closed path that includes the second movement path. A path portion that supplements the second movement path to form the closed path is thus provided for parallel guidance of workpieces back from the third position into the second position.

Through the action of the first and/or third movement unit, for example the first movement unit, a holding unit that holds a workpiece in the second position is moved out of this path or into this path. In an expedient embodiment, the running rail has an interruption for this purpose.

In a particularly preferred design, the moving system is controlled by the control system thereof in such a way that a workpiece held by a holding unit leaves the second position and a workpiece held by another holding unit leaves the third position in a coupled and simultaneous manner under the action of the second movement unit. Thus, individual actuation of the holding units is not required during the movements thereof along the closed movement path.

In a further preferred embodiment, during the movement on the first and/or third movement path, the holding unit(s) have no coupling to the first and/or third movement unit that requires releasing, aside from a merely bracing coupling. In principle, variants are also conceivable in which coupling, for example of the first movement unit to the holding unit, is provided by a clamp or by a latch mechanism, which is released before the movement along the second movement path starts. However, the aforementioned variant is simpler to implement and does not require any additional actuators or mechanical unlatching devices.

In a further preferred embodiment, the moving system has a rotary cage, of which the support structure, acting parallel to the axis of rotation of the second movement unit, is formed by running bars of the guide arrangement. This further makes it possible to keep the inertia countering the movement along the second movement path low. A support structure acting in a circumferential direction may have a toothing, which may have a dual function in the form of a coupling to the second movement unit.

In a further preferred embodiment, the moving system has, in constructional terms, a column-like support on which the movement units are arranged and about which in particular the rotary cage can rotate. This results in a compact overall system, and the installation space required for additional stations such as lifting stations is not needed. In particular, the column may also support a tailstock arrangement.

In an expedient embodiment, a drive is provided for each movement unit. For example, a rotary drive that drives the rotary cage via a gearwheel coupling could be provided for the second movement unit. The first and/or third movement unit could, for example, be driven hydraulically or pneumatically by way of piston-cylinder devices.

The length of the first and/or third movement path can be set by way of an associated drive control system. Usually, the length of the third movement path is less than that of the first movement path. Preferably, however, the maximum settable length of the third movement path is greater than conventional axial dimensions of typical clamping devices.

The holding unit is preferably a gripping holding unit.

In a preferred embodiment, the holding unit, in particular every holding unit, has two holding arms, the distance between which can be altered. The holding arms may hold the workpieces by clamping. In particular, for this purpose, the holding arms may be biased for gripping. In this case, the bias may be settable for a selected holding distance between the holding arms.

In this connection, it is expediently provided that the holding arms have holding jaws releasably attached thereto, of which the face facing the workpiece is adapted in particular to the workpiece contour. In this case, if a workpiece batch is changed, it would merely be necessary to replace the holding jaws, if required, and if applicable to set the holding arm system to a new desired holding distance.

The moving system is suitable for disc-shaped wheels, as well as for shaft-shaped workpieces.

In a further embodiment, the moving system may also further have a feeding and removal device, which is designed in particular as a continuous feeder or continuous belt and which brings the workpieces into the first position (and preferably transports the machined workpieces out of the first position). In this case, it is preferably provided that the feeding and removal device feeds the workpieces at a height above the ground that is at least 75 cm, preferably at least 90 cm and preferably less than 135 cm, in particular less than 120 cm, as measured at the end thereof facing the ground.

A tool feed using the feeding and removal device can take place by way of tool pallets that carry the workpieces. If the workpieces are disc-shaped, they are threaded in the hole thereof, for example with play, onto a centering mandrel on the pallet, and laid on the support surface of the pallet. If the workpieces are shaft-shaped, it is provided that they are inserted, with play, into a receiving hole of a pallet and optionally also laid on a support surface of the pallet. The holding unit does not grip the pallet, but grips the workpiece directly.

Further, the invention protects a gear-cutting machine, comprising at least one workpiece spindle for receiving a workpiece and a workpiece loading and unloading system that has a moving system according to any of the aforementioned aspects.

DETAILED DESCRIPTION

Further features, details and advantages of the invention will be apparent from the following description, with reference to the accompanying drawings, in which.

Figure 1:
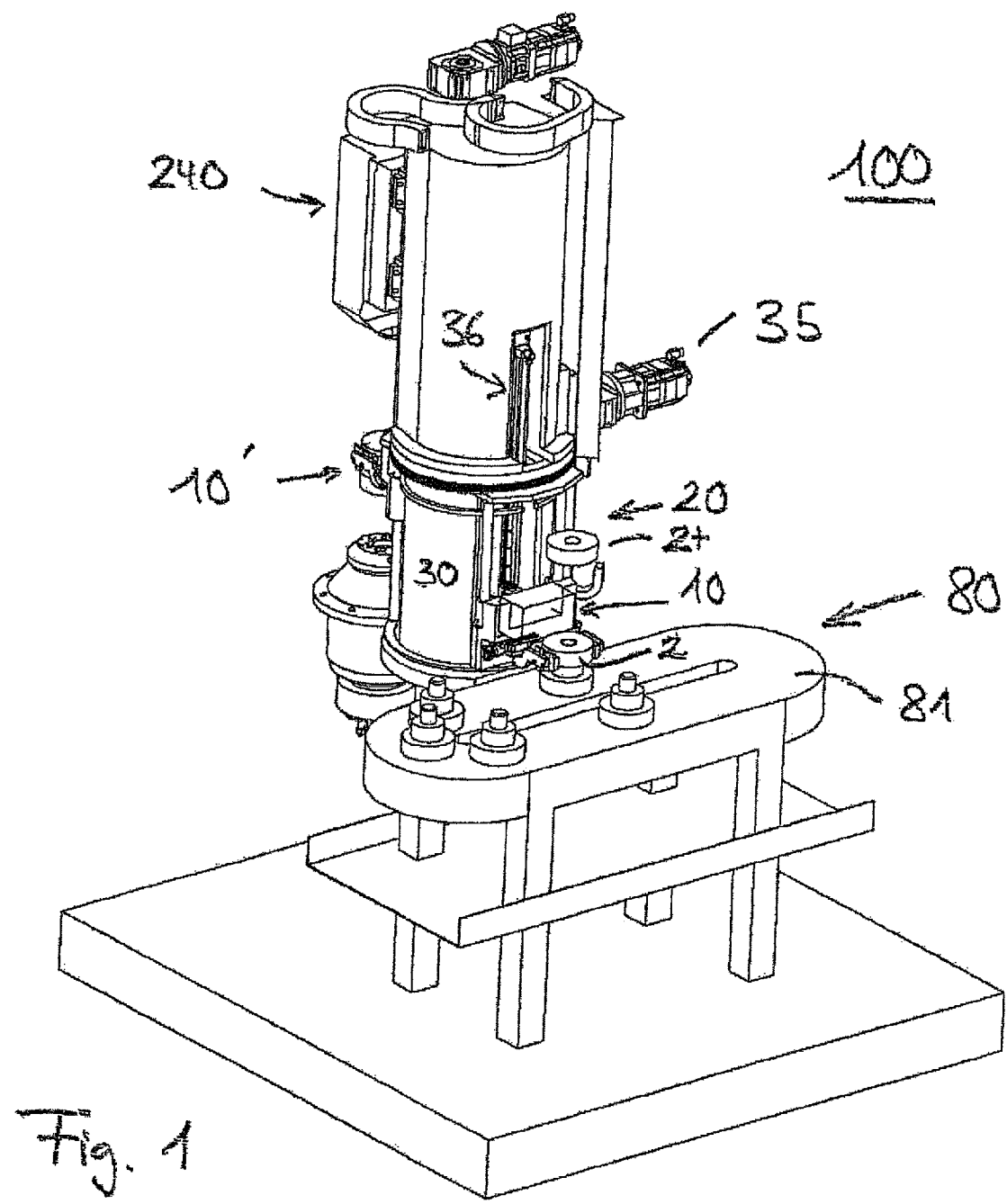
FIG. 1 is a perspective view of a moving system.
Figure 3:
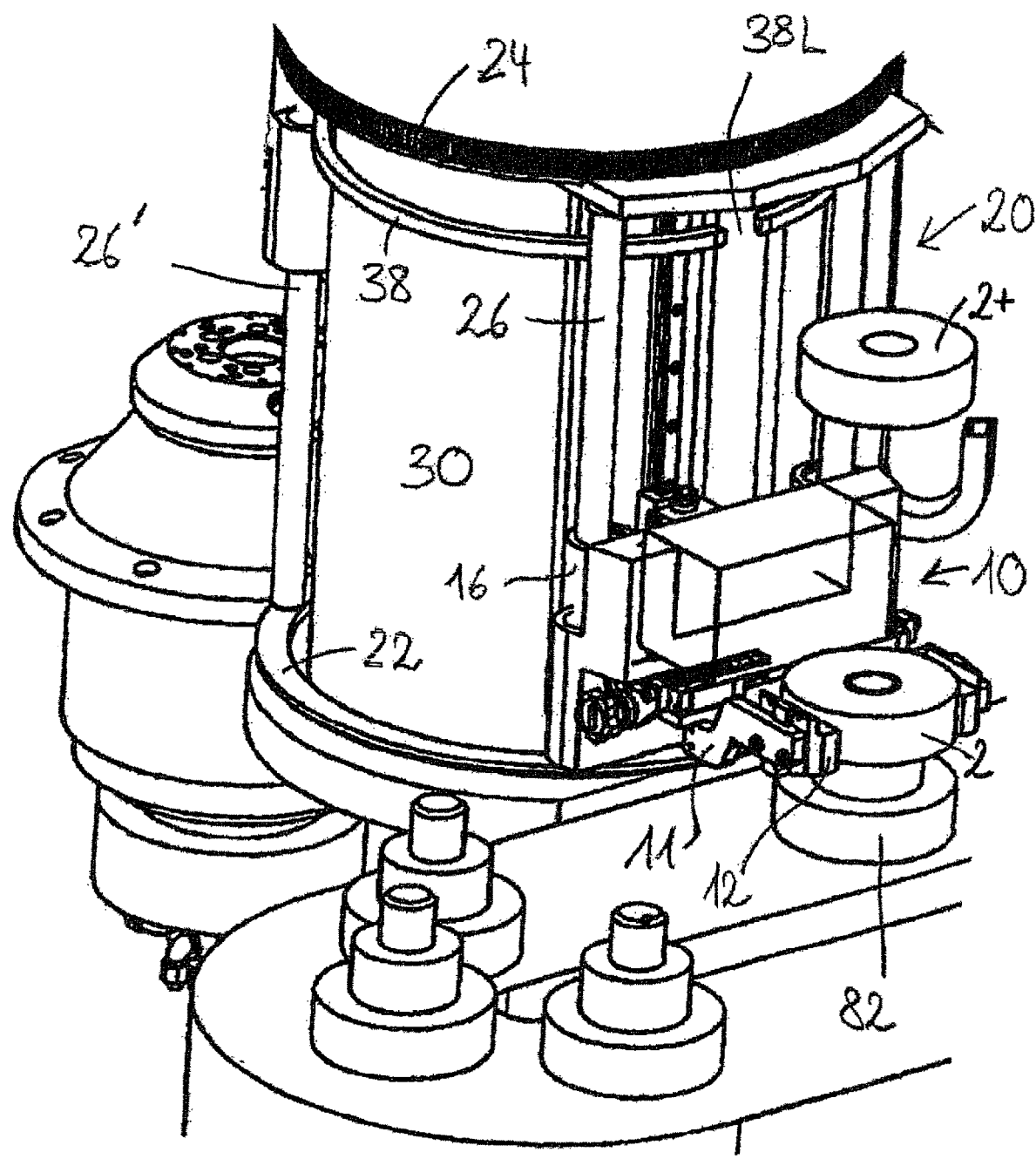
FIG. 3 is an enlarged view of a sub-region of FIG. 1.

As can be seen in FIG. 1, a moving system 100 has a column 30, in the lower region of which a rotary cage 20 is arranged rotatably about the column 30. The rotary cage has a gear rim 24 as an upper circumferential support structure and a ring 22 as a lower circumferential support structure (FIG. 3). The rotary cage 20 further has rods as an axial support structure, which additionally form guide rods 26 for holding units 10, 10'. A drive 35 attached to the column 30 can set the rotary cage 20 in rotation via a gearwheel coupling to the gear rim 24. In this context, a 180.degree. step is provided for the rotary movement of the rotary cage 20, in such a way that after a movement the guide rods 26 assigned to the holding unit 10 change places with the guide rods 26' assigned to the holding unit 10'.

Figure 4:
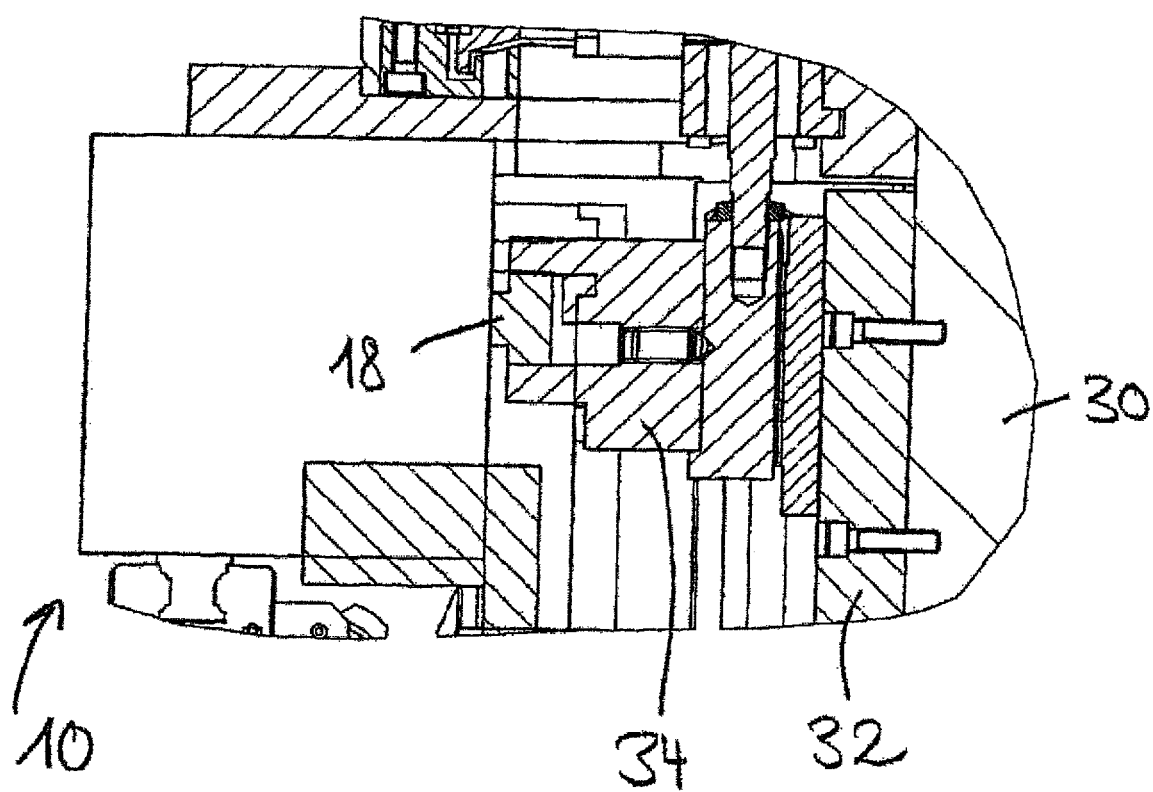
FIG. 4 is an axial sectional view of a moving mechanism for a first movement path.

In the lower region of the column 30, a running rail 32 that is axial in the column direction is arranged (see FIG. 4), along which rail a tappet 34 coupled to a drive 36 can move. The drive 36 may, for example, be a pneumatic or hydraulic drive in the form of a piston-cylinder device. The tappet 34 has, on the face thereof remote from the running rail 32, a receiving region of U-shaped section. In this, a roller 18 can be received, which is fixed to the face of the holding unit 10 facing the column 30 in a manner allowing rotation of the roller about the axis thereof. The axis of rotation of the roller 18 extends horizontally from left to right in FIG. 4 (corresponding to a radial direction with respect to the column 30 in polar coordinates). If the roller 18 is entrained in the tappet 34, the holding unit will follow the movement of the tappet 34 when it moves, and the movement of said unit is guided by the guided regions 16 thereof that engage around the guide rods 26.

Referring to FIG. 1, a vertical movement of this type would move the holding unit 10 that holds a workpiece 2 in the position shown in FIG. 1 vertically upwards, in such a way that the held workpiece 2 is moved into a higher position. The workpiece 2 in this higher position is denoted as 2+ in FIG. 1. In this context, the position of the workpiece 2, as shown held in FIG. 1, corresponds to the first position, and the position of the workpiece denoted as 2+ corresponds to the second position.

Figure 2:
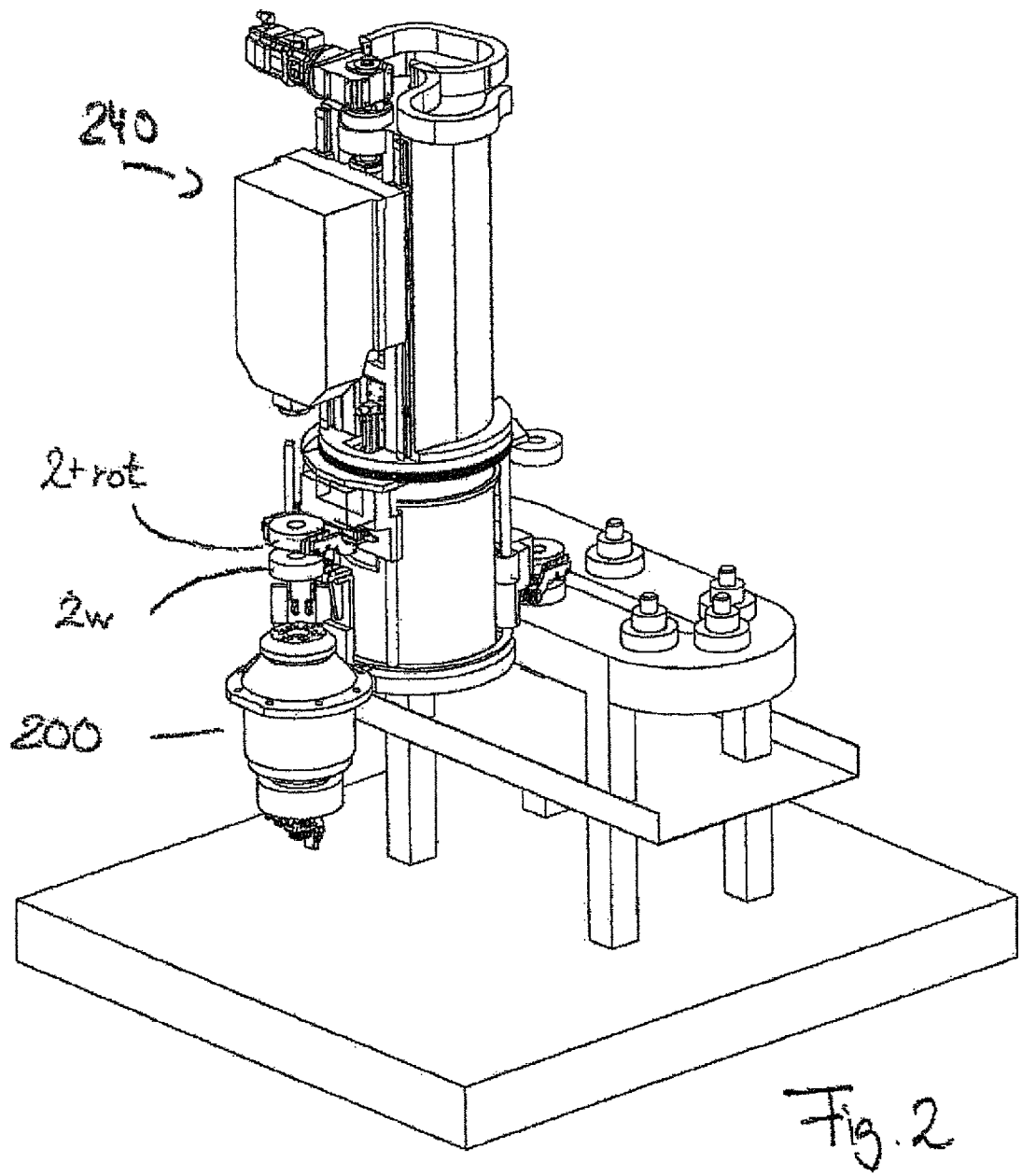
FIG. 2 is a perspective view of the moving system from a different viewing angle.

On the column 30, a running rail 38 formed in the shape of an arc is fastened at a height below the gear rim 24. However, the running rail 38 is not continuous in the region of the running rail 32, but rather a gap 38L is provided, through which the roller 18 can pass during the vertical movement thereof when being entrained by the tappet 34. After vertical movement of the holding unit 10, during which the workpiece 2 moves along the first movement path that moves it from the first position into the second position, the holding unit 10 can, as shown in the embodiment (180.degree. step), be rotated through 180.degree., by rotational movement of the rotary cage 20, into the position taken up by the holding unit 10' in the drawing of FIG. 1. The workpiece 2 thus moves along a second movement path from the second position into the third position. The workpiece 2 is visible in this third position in FIG. 2, and denoted by 2+ rot in this position (FIG. 2).

On this machining side of the column 30, a further vertical movement unit is provided, which is formed substantially identically to the previously described vertical movement unit on the side of the column 30 remote from the machining. Using this (third) movement unit, the workpiece 2 can be placed on a clamping device (not shown in FIG. 2), which is attached in a torque-proof manner to a workpiece spindle 200 of a gear-cutting machine. In this position, in which the workpiece 2 is machined, the workpiece 2 is denoted as 2w (fourth position).

Figure 5:
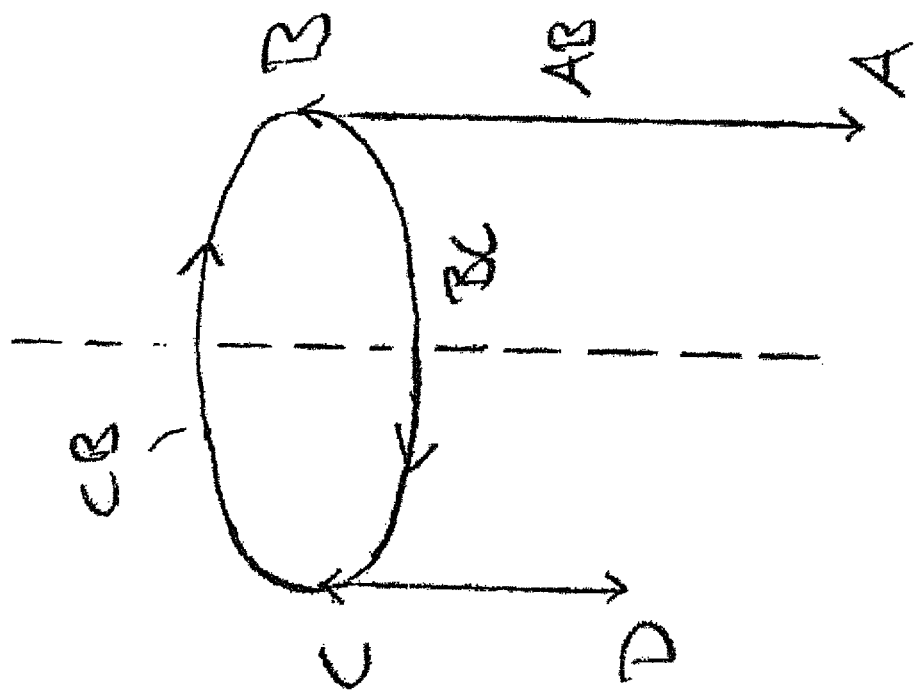
FIG. 5 is an illustrative, abstract drawing of workpiece positions.

The positions passed through by a workpiece 2 during the movement of the moving system 100 are shown again in FIG. 5, without machine components. From position A, the workpiece 2 is lifted into position B as a result of the first movement unit, and subsequently pivoted into position C as a result of the second movement unit, and then lowered into the position D as a result of the third movement unit (loading process). For unloading, the machined workpiece 2 is lifted from position D into position C, then pivoted back into position B, and lowered into position A again. While the machined workpiece 2 is being moved from position C into position B, a next workpiece to be machined (held by the other holding unit 10') is already simultaneously being pivoted from position B into position C.

It can easily be seen from FIG. 5 that, if a plurality of holding units 10", 10" . . . (not shown) are used, steps other than 180.degree. rotations can also be run, for example 120.degree. rotations or 90.degree. rotations. In this case too, a workpiece 2 arrives back in position B after passing through a closed circular path (a full clock cycle), having been machined in the meantime. In the case of a 120.degree. step, the workpiece feeding and removal side of the column 30 and the machining side of the column 30 are arranged not on opposite sides, but at an angle of 120.degree.. This results in a further position, in which a workpiece is held on the closed movement path and in which, for example, secondary machining could be provided at the workpiece. A 90.degree. step results in two further positions; in this case, the feeding side and machining side may be at an angle of 90.degree., or else be provided offset through 180.degree. as in FIG. 1.

FIG. 1 also likewise shows a feeding and removal unit 80, here schematically represented by a continuous belt 81, on which workpiece pallets 82 that carry the workpieces 2 on its circuit circulate. It will be noted that the holding unit 10 directly grips the workpiece 2. The two holding arms 11 provided for this purpose have holding jaws 12 internally in the gripping region thereof, which are formed adapted to the outer contour of the workpieces 2.

The workpieces may be disc-shaped gearwheels or gearwheel blanks, as in FIG. 1, but a movement for loading and unloading shaft-like workpieces is also conceivable. In this case, the column 30 may also additionally serve as a support column for a tailstock arrangement 240 of the gear-cutting machine, said machine or the workpiece spindle 200 thereof being loaded with workpieces 2 and unloaded of machined workpieces 2 using the moving system 100.

However, the coupling shown, comprising the tailstock arrangement 240, is only one possible configuration and coupling system of the moving system 100, which may also be provided independently.

Also, incidentally, the aforementioned embodiments of the invention are not to be treated as limiting the invention. Rather, individual features of the invention and of the following claims may be essential for implementing the invention in the various embodiments thereof.

The invention claimed is:
1. Moving system (100) for moving workpieces, the moving system (100) comprising:
a support column (30);
a rotary cage (20) configured for rotating about the support column (30);
at least two holding units (10, 10') provided on the rotary cage (20) for rotation therewith about the support column, each of the holding units (10, 10') configured for gripping a respective one of the workpieces;
a first movement unit (36, 32, 34) comprising a drive (36);
a second movement unit (35);
wherein one of the holding units (10, 10') is configured to pick up one of the workpieces from a first position (A) and to directly grip the one workpiece;
wherein the first movement unit (36, 32, 34) is configured to linearly move the one holding unit (10, 10') and the gripped one workpiece from the first position (A) to a second position (B);
wherein the second movement unit (35) is configured to rotationally index the holding units (10, 10') to move the one holding unit and the gripped one workpiece from the second position (B) to a third position (C) that is closer to a workpiece spindle (200) of a gear-machining machine than is the second position (B);

wherein the drive (36) of the first movement unit (36, 32, 34) is mounted on an upper portion of the support column (30) such that when the one holding unit (10, 10') and the gripped one workpiece are rotationally indexed from the second position (B) to the third position (C) via the second movement unit (35), the drive (36) of the first movement unit is not moved with the holding units (10, 10'), and wherein moving system (100) is also designed to move machined workpieces, machined by the gear-machining machine, out of the third position (C).

2. Moving system according to claim 1, wherein the first movement unit and/or the second movement unit have only one degree of freedom of movement.

3. Moving system according to claim 1 wherein the second movement unit comprises a drive for rotating the rotary cage (20) via a gearwheel coupling.

4. Moving system according to claim 3 wherein the second movement unit is configured to cause rotary movement of the rotary cage that is clocked in a 360°/n step, where n is 2, 3 or 4.

5. Moving system according to claim 1 wherein the first movement unit is a linear movement unit for a vertical movement.

6. Moving system according to claim 1, wherein the second movement unit (35) is configured to rotationally index the holding units (10, 10') to move the one holding unit and the gripped one workpiece from the second position (B) to the third position (C) along a movement path that is curved and that takes the form of an arc portion.

7. Moving system according to claim 6, wherein the movement path that is curved takes the form of a semicircle.

8. Moving system according to claim 1, comprising a third movement unit, which is configured to cause the gripped one workpiece that is still held directly by the one holding unit to be moved from the third position (C) along a movement path (CD) into a fourth position (D) that differs from the third position and in which fourth position gear-cutting machining is configured to take place.

9. Moving system according to claim 1 comprising a guide arrangement (26, 16), which guides the one holding unit during the movement of the one holding unit and the gripped one workpiece from the first position (A) to the second position (B), and which guide arrangement (26, 16) moves together with the one holding unit and the gripped one workpiece as the one holding unit and the gripped one workpiece move from the second posit; on (B) to the third position (C).

10. Moving system according to claim 9, wherein the guide arrangement (26, 16) comprises bars (26) that act as a support structure for the rotary cage (20).

11. Moving system according to claim 1 comprising a running rail (38) on which the one holding unit moves during the movement of the one holding unit and the gripped one workpiece from the second position (B) to the third position (C).

12. Moving system according to claim 1, wherein the at least two holding units comprise n≥2 holding units (10; 10'), which are identically formed.

13. Moving system according to claim 12, wherein the moving system is configured such that when the second movement unit is actuated to rotationally index the holding units, one of the workpieces held by one of the holding units (10) leaves the second position (B) at the same time that another of the workpieces held by another of the holding units (10') leaves the third position (C).

14. Moving system according to claim 1 wherein the drive (36) of the first movement unit comprises a piston-cylinder device.

15. Moving system according to claim 1, wherein the rotary cage (20) is configured to rotate about a lower region of the support column (30).

16. Moving system according to claim 1, wherein the second movement unit (35) further comprises a drive.

17. Moving system according to claim 1 wherein each of the holding units has a respective two holding arms (11), wherein for each of the holding units, a distance between the corresponding two holding arms (11) can be altered.

18. Moving system according to claim 17, wherein the holding arms each have a respective releasably attached holding jaw (12) having a respective face facing the workpiece to be gripped thereby that is adapted to a contour of the workpiece to be gripped thereby.

19. Moving system according to claim 1 comprising a feeding and removal device (80), which is designed as a continuous feeder and which brings the workpieces into the first position at a height of an end of said feeding and removal device facing the ground, between 75 cm and 135 cm above the ground.

20. Gear-machining machine, comprising:
a workpiece loading and unloading system,
wherein the loading and unloading system has a moving system (100) according to claim 1, and
wherein the gear-machining machine further comprises the workpiece spindle (200), which workpiece spindle (200) is configured to receiving one of the workpieces from the moving system.

* * * * *